United States Patent [19]

Sliemers et al.

[11] 4,419,382
[45] Dec. 6, 1983

[54] PLASMA POLYMERIZED COLOR COATINGS

[75] Inventors: Francis A. Sliemers, Columubs; Vincent D. McGinniss, Delaware, both of Ohio

[73] Assignee: Battelle Development Corporation, Columbus, Ohio

[21] Appl. No.: 330,098

[22] Filed: Dec. 14, 1981

[51] Int. Cl.³ .............................................. B05D 3/06
[52] U.S. Cl. ........................................ 427/40; 427/41
[58] Field of Search ................................... 427/40, 41

[56] References Cited

U.S. PATENT DOCUMENTS

| | | | |
|---|---|---|---|
| 3,936,530 | 2/1976 | Morgan | 427/41 X |
| 4,084,020 | 4/1978 | Mathias et al. | 427/41 |
| 4,289,798 | 9/1981 | Bagley et al. | 427/41 X |

Primary Examiner—James R. Hoffman
Attorney, Agent, or Firm—Barry S. Bissell

[57] ABSTRACT

Thin, pinhole-free, adherent, colored polymeric coatings and articles are produced by plasma polymerization followed by a heat treatment. The polymer precursor is mixed with a dye or pigment and shaped into a self-supporting thin article or applied to a substrate. The coating or article is then polymerized under plasma conditions created by an applied electrical field. Subsequent heat treatment further cures the polymer and makes the coating adherent to the substrate.

4 Claims, No Drawings

PLASMA POLYMERIZED COLOR COATINGS

BACKGROUND OF THE INVENTION

Plasma polymerization, also known as glow discharge polymerization, is a process in which an organic substance ("monomer") is made to form a polymeric material by means of glow discharge. The glow discharge may be generated by low-frequency AC, audio-frequency, rf power, or microwave power. This type of process is typically used to synthesize new organic polymers in bulk from the vapor phase, but the technique has a much wider application for forming coatings. By selection of materials and process conditions that lead to polymers with a high degree of crosslinking, coatings that are very dense, hard, and pinhole-free can be formed.

In typical experimental method utilizing a monomer vapor, specimens to be coated are placed in a vacuum chamber which is fitted with parallel electrodes. Specimens may be placed either directly on either electrode or suspended between the electrodes. The chamber is evacuated and partially backfilled with an inert gas. Monomer vapor is then admitted to the desired pressure and power is applied to produce a glow discharge between the electrodes. The molecules of monomer vapor entering the discharge region are excited and fragmented by the field to produce highly reactive ions and free radicals. These fragments then collide with monomer molecules, both excited and unexcited, that have condensed on the substrate. The collisions excite the monomer molecules forming absorbed radicals which then combine to form long-chain, highly crosslinked polymeric films. Because of this high degree of three-dimensional crosslinking, such films can have properties significantly superior to polymeric films formed by conventional processes. The present invention retains these desirable properties in coatings which are predeposited rather than being formed in situ from a vapor.

Plasma polymerization of numerous reactive materials, including various monomers containing a functional group permitting polymerization by more conventional means, from the vapor phase into condensed films, is extensively taught in the printed literature. The printed knowledge also includes teachings of these films being deposited as plasma-formed polymer on numerous substrate materials. Illustrative teachings of plasma polymerization art can be found in "Techniques and Applications of Plasma Chemistry" by John R. Hollahan and Alex T. Bell, John Wiley & Sons, 1974, pages 191–213 under the section titled "Mechanisms of Plasma Polymerization". This section includes a Table 5.5, titled "Films Produced by Plasma Techniques", which tabulates numerous plasma-polymerizable materials, i.e. materials functioning as monomers under plasma, as well as films resulting therefrom. Included in the reported prepared films are several colors such as brown or yellow, although insofar as is known, none of the plasma-formed, colored films are prepared by the method of the present invention involving predeposited coatings and a two step curing process.

SUMMARY OF THE INVENTION

It is an object of the invention to provide a method for making pinhole-free, adherent, color coatings.

It is further an object to provide such a method which is pollution free.

It is also an object to provide such a process which utilizes conventional plasma polymerization apparatus but which utilizes the polymer precursor in a predeposited state rather than in the vapor state.

It is finally an object to provide a method for applying a polymer coating, in a wide variety of colors, to plastics, metallized plastics, metals and other conventional substrate materials.

In accordance with the objectives, the invention is a method for producing a colored polymer film by introducing a layer of a plasma reactive precursor (reactive meaning either polymerizable or curable under the plasma) into plasma polymerization apparatus, said precursor having a dye and/or pigment mixed therein, and producing a glow discharge (inert gas plasma) in the apparatus sufficient to initiate free radical formation, polymerization (where necessary), and partial crosslinking in the precursor layer. For precursors with high glass transition temperatures, the plasma-exposed layer is subsequently heat treated for a time sufficient to further cure the layer and make it more adherent and coherent.

The precursor layer is preferably a solid monomer or polymer or a high molecular weight liquid monomer or mixtures thereof which are essentially nonvaporizable under the plasma polymerization conditions.

The layer may be a self-supporting body or is preferably introduced as a coating layer on a substrate which may be, for example, glass, metal, plastic, ceramic, paper, etc.

The heat treatment is preferably done under non-oxidizing conditions and may be carried out in the plasma polymerization apparatus. The heat treatment is preferably carried out at a temperature of at least about 10° C. above the glass transition temperature of the polymer. Where the polymer has a high glass transition temperature, i.e., above the ambient temperature during the plasma polymerization step, the heat treatment is necessary to complete the cure, as well as to improve adherence and coherence of the coating. When the material has a low glass transition temperature (i.e., below the ambient temperature), the heat treatment is unnecessary for curing but may be desirable for improved adherence and coherence of the coating.

DETAILED DESCRIPTION

Conventional plasma polymerization apparatus is useful herein and generally comprises a pressure chamber having anode and cathode electrodes therein, means for evacuating the chamber and backfilling it with an inert gas and means for supplying power to the electrodes. The electrodes may be water cooled.

In operating the apparatus, the chamber is evacuated of air and backfilled with a small quantity of inert gas. A glow discharge is then produced by applying low-frequency AC, audio-frequency, rf power or microwave power, to the electrodes. The induced field ionizes the inert gas molecules and increases their mobility.

The present invention comprises introducing a plasma polymerizable or reactive precursor into the plasma apparatus. Unlike prior processes which introduce the precursor as a monomer vapor, the present invention comprises introducing a preformed layer of the precursor into the apparatus, either as a thin product itself or as a coating on a substrate. The layer may be directly attached to the cathode or anode during the plasma polymerization process or may be suspended there between. If the substrate is conductive, it may also serve as the cathode if convenient.

Since the plasma polymerizable precursor does not begin as a vapor, it may consist of any polymerizable and/or curable materials which may form a cohesive layer and which are essentially nonvaporizable under the temperature and pressure conditions of the plasma polymerization process. Solid polymers and solid monomers as well as some high molecular weight liquid monomers, and mixtures thereof, may be used. Examples of plasma-reactive materials, which are useful in the invention, include those types listed in Table 1.

TABLE 1

| Polymer Types and Their Glass Transition Temperatures | |
|---|---|
| Polymer Type | $T_g$ (°C.) |
| Ethylene | −125 |
| Butyl Acrylate | −55 |
| Butene - 1 | −24 |
| Ethyl Acrylate | −24 |
| Vinyl Fluoride | 41 |
| Isobutyl Methacrylate | 50 |
| Hydroxyethyl Acrylate | 55 |
| Vinyl Chloride | 81 |
| Vinyl Alcohol | 85 |
| Acrylonitrite | 97 |
| Methyl Methacrylate | 105 |
| Styrene | 110 |

To obtain the color mixtures, the plasma-reactive precursors are mixed with quantities of conventional colorants, dyes and/or pigments, or materials capable of reacting under the plasma conditions to form dyes and/or pigments. For example, imine, xanthene, azo, phenothiazine, and oxazine dyes may be used. In particular, dyes known as Auramine O, Erythrosin B, Methylene Blue, Metanil Yellow, Congo Red, and Nile Blue A are preferred to produce a variety of color in the mixtures.

Common pigments such as the oxides, sulfates, silicates or chromates of tin, lead, zinc, titanium, barium, calcium, magnesium, iron and copper are useful in producing color. The present plasma process is particularly attractive for pigmented materials since it is hard to UV-cure pigmented organic coatings.

In this regard, the present predeposition method allows the addition of other materials to the colored polymer coatings. Some of these materials, such as UV stabilizers, would not be able to be added in conventional plasma polymerization of monomers from the vapor phase. For example, some useful UV stabilizers are Ciba Geigy's TINUVIN P [2-(2'-hydroxy-5'-methyl phenyl) benzotriazole], American Cyanamid's CYANOX LTDP [dilaurylthiodiproprionate], American Cyanamid's CYASORB UV-531 [2-hydroxy-4-n-octyl phenol sulfide], and Monsanto's SANTONOX R [4,4'-thiobis(6-t-butylmetaeresol)].

In practicing the inventive method, the solid materials (including dyes, pigments, and any other additives) are preferably slurried or dissolved in liquid and applied as a thin coating to a substrate. Alternatively, they could be slurried into a paste and formed into a self-supporting shape by conventional forming techniques (eg. casting or extruding). Liquid monomers may be combined with the dyes and pigments and applied directly.

After forming, the coatings or layer shapes are typically dried to a solid film and then inserted into the plasma polymerization apparatus near the cathode. The chamber is evacuated to about $10^{-5}$ torr or lower and then backfilled with a few millitors of inert gas, preferably argon. Power is applied to the electrodes in the range of about 10-100 watts to produce an inert gas plasma which bombards the predeposited layer and causes free radical formation therein. The power is applied for a period sufficient to cause free radical formation throughout the thickness of the layer to be polymerized or cured. The free radicals may then combine to form long chain polymers and may crosslink to some degree depending on the mobility of the molecules.

Plasma-exposed, predeposited layers of high-$T_g$ polymers at this stage tend to be only partially cured and somewhat non-cohesive and non-adherent to the substrates. We believe that this is a result of the predeposition of the material in our method. In normal plasma polymerization from the vapor state, the free radicals are formed before deposition and have sufficient mobility, while being deposited in the reactive state, to interact and crosslink with other molecules. In contrast, we believe that the predeposition and subsequent free radical formation in our process eliminates this mobility in the reactive state, especially in the high-$T_g$ polymers and, therefore, a heat treatment step is necessary to provide mobility to further crosslink the molecules.

The heat treatment may be carried out in the plasma apparatus or in secondary apparatus. Preferably, it is done under non-oxidizing conditions to prevent any oxygen scavenging of free radical sites which remain in the material after plasma exposure. The heat treatment is preferably accomplished at a temperature and for a time sufficient to fully cure the layer to an adherent, cohesive, insoluble layer. Typically, a temperature of at least about 10° C. above the glass transition temperature of the plasma-reactive precursor is sufficient to fully cure the materials.

EXAMPLES 1–6

Aqueous solutions of 5 weight percent polyvinyl alcohol (PVA) and a small amount of dye were prepared and cast on a glass substrate. The liquid films were oven dried to a solid coating.

The coated substrates were then placed directly on the cathode in the plasma polymerization 20 apparatus. The chamber was evacuated to a pressure of about $10^{-5}$ torr and backfilled to a pressure of 25$\mu$ with argon. The coatings were subjected to the argon plasma over a period of between ½ and 2 hours at 10 watts rf power. Coatings were at least partially soluble in acetone and were not adherent to the substrates.

Thereafter, the coated substrates were moved to a second vacuum chamber wherein a heat treatment was carried out to more fully cure the coatings and to make them adhere to the substrates.

TABLE 2

| Sample | Dye | Plasma Exposure Time, Hrs. | Vacuum Thermal Treatment | | Color |
|---|---|---|---|---|---|
| | | | Time Hrs. | Temp. °C. | |
| 77-2 | Auramine O | 0.5 | 1 | 200 | Yellow |
| 78-1 | Erythrosin B | 2 | 1 | 200 | Red |
| 79-1 | Methylene Blue | 2 | 1 | 225 | Blue |
| 83-1 | Metanil Yellow | 2 | 1 | 200 | Yellow |
| 83-2 | Congo Red | 2 | 1 | 200 | Red |
| 87-3 | Nile Blue A | 2 | 1 | 160 | Blue |

The Methylene Blue, Metanil Yellow, and Congo Red coatings were made insoluble in acetone while the others were still partially soluble. All were substantially more insoluble following the heat treatment than before. Insolubility could not be attained with the heat treatment alone.

EXAMPLES 7-9

Coatings were prepared as above in PVA but using steel substrates and the pigments lead oxide (red), Monastral Green B, and Monastral Blue B. The latter are compounds containing metal ion complexes and are acid and a solid epoxy resin (eg. Dow 661, a diglycidyl ether of bisphenol A, about 1200 molecular weight).

Coatings may be made and exposed to argon plasma under the conditions of example 1. Coatings of the polyesters or acrylic resins with a PbO pigment and the Actomer X-80, in most cases, need not be cured by heat treatment following plasma exposure, whereas, the coatings comprising the high-$T_g$, reactive material must be heat cured to form adherent, cohesive coatings.

TABLE 3

| Monomers | POLYESTER STRUCTURES | | | | | | |
|---|---|---|---|---|---|---|---|
| | 11a | 11b | 11c | 11d | 11e | 11f | 11g |
| Isophthalic Anhydride | 3 moles | | | | | | |
| Hexa-Hydro-Phthalic Anhydride | | 3 moles | 4 moles | 6.39 moles | 3.6 moles | 4 moles | 1 mole |
| Adipic Acid | 0.6 moles | 0.6 moles | 0.8 moles | | | | |
| Hydrogenated Bisphenol-A Cyclohexane | 4 moles | 4 moles | | 5 moles | 4 moles | 5 moles | 2 moles |
| Dimethanol Neo-Pentyl Glycol | 0.6 moles | 0.6 moles | 0.8 moles | 5.1 moles | 0.6 moles | | |
| Acid Number (final) | 24 | 15 | 7.5 | 85 | 22.4 | 18 | 9.6 |
| % OH (final) | 0.2 | 1.6 | 2.2 | 0.2 | 1.0 | 1.3 | 4.2 |
| M wt. (calculated) | 3727 | 1654 | 1401 | 1220 | 2075 | 1852 | 757 |
| Tg C.° | | | | | | | |
| low value | 58 | 53 | −5 | 23 | 64 | 76 | 57 |
| high value | 72 | 65 | 1 | 27 | 71 | 83 | 67 | produced by DuPont Chemical Co. The coated substrates were exposed to argon plasma as in Example 1 for two (2) hours followed by heat treatment at 200° C. for one (1) hour. Pinhole-free, dense, adherent colored coatings were produced which were substantially insoluble in acetone.

EXAMPLE 10

The effect of the plasma exposure was demonstrated using an acrylic unsaturated prepolymer which is an adduct of acrylic acid and epoxidized soybean oil (Union Carbide Actomer X-80). The prepolymer was mixed with 1% by weight lead oxide to produce a deep orange plasma reactive precursor.

An aqueous solution of the precursor was made and a thin film was laid on a glass substrate. One half of the coating was covered with a glass slide which shields the coating from an inert gas plasma. The substrate was subsequently placed in a plasma generator and exposed to argon plasma as in example 1 for 15 minutes. After exposure, both the covered and uncovered portions of the coating were still tacky and moderately soluble in acetone.

The substrate and coating were then subjected to a 100° C./10 minute heat treatment. This treatment cured the uncovered (plasma exposed) coating as evidenced by insolubility in acetone. The covered coating which was not exposed to the argon plasma remained uncured after the heat treatment. This demonstrates that (for a high-$T_g$, reactive material), the two-step process is necessary to form free radicals and then cure the coating. A heat treatment by itself is insufficient.

EXAMPLE 11

Good adherent color coatings may be obtained by mixing any of the saturated polyester structures of Table 3 or the acrylic resin structures of Table 4 with about 10 weight percent of an unsaturated acrylic oligomer. The reactive oligomer may be, for example, a low-$T_g$ material such as the Actomer X-80 of example 10 or a high-$T_g$ material such as an adduct of acrylic

TABLE 4

| SATURATED ACRYLIC RESIN STRUCTURES | |
|---|---|
| Monomers | Tg °C. |
| Methyl methacrylate | 105 |
| Styrene | 110 |
| Isobutyl methacrylate | 50 |
| Butyl Acrylate | −55 |
| Hydroxyethyl Methacrylate | 55 |
| 2-Ethylhexyl Acrylate | −112 |

We claim:
1. A process for producing an adherent, colored-polymer coating on a substrate comprising
   (A) coating a substrate with a layer of a plasma-reactive precursor and an additive comprising a dye, pigment or a material capable of reacting under plasma conditions to form a dye or pigment,
   (B) introducing the coated substrate into plasma polymerization apparatus having a low-pressure environment comprising a plasma-forming inert gas,
   (C) producing a glow discharge for a time sufficient to form a plasma from the inert gas and to initiate free radical formation, polymerization and crosslinking throughout the thickness of the plasma reactive precursor layer forming a partially cured coating on the substrate, and thereafter
   (D) heat treating the partially cured coating at a temperature and for a time sufficient to complete the cure reaction and increase the adherence of the coating to the substrate.
2. The process of claim 1 which comprises heat treating the plasma-exposed layer in non-oxidizing atmosphere.
3. The process of claim 2 which comprises heat treating the plasma-exposed layer in a low-pressure environment.
4. The process of claim 1 wherein the heat treatment is carried out at a temperature of at least about 10° C. above the glass transition temperature of the precursor.

* * * * *